US009754400B2

(12) United States Patent
Otto et al.

(10) Patent No.: US 9,754,400 B2
(45) Date of Patent: Sep. 5, 2017

(54) DEVICE, METHOD AND COMPUTER PROGRAM FOR RECONSTRUCTING A MOTION OF AN OBJECT

(71) Applicant: FRAUNHOFER-GESELLSCHAFT ZUR FOERDERUNG DER ANGEWANDTEN FORSCHUNG E.V., Munich (DE)

(72) Inventors: Stephan Otto, Heroldsberg (DE); Ingmar Bretz, Regenstauf (DE); Norbert Franke, Erlangen (DE); Thomas Von Der Gruen, Kleinsendelbach (DE); Christopher Mutschler, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 166 days.

(21) Appl. No.: 14/646,663

(22) PCT Filed: Nov. 12, 2013

(86) PCT No.: PCT/EP2013/073558
§ 371 (c)(1),
(2) Date: May 21, 2015

(87) PCT Pub. No.: WO2014/079729
PCT Pub. Date: May 30, 2014

(65) Prior Publication Data
US 2015/0310656 A1 Oct. 29, 2015

(30) Foreign Application Priority Data
Nov. 22, 2012 (DE) .................. 10 2012 111 304

(51) Int. Cl.
*G06T 17/00* (2006.01)
*G06T 13/40* (2011.01)
*G06K 9/00* (2006.01)

(52) U.S. Cl.
CPC .......... *G06T 13/40* (2013.01); *G06K 9/00342* (2013.01); *G06T 17/00* (2013.01)

(58) Field of Classification Search
None
See application file for complete search history.

(56) References Cited

U.S. PATENT DOCUMENTS 6,552,729 B1 * 4/2003 Di Bernardo ........... G06T 13/20
345/473
7,120,276 B1 * 10/2006 Brady .................. G06K 9/6206
382/107

(Continued)

FOREIGN PATENT DOCUMENTS

| CN | 102236912 | 11/2011 |
| EA | 011541 | 4/2009 |
| WO | WO-2014006143 A1 | 1/2014 |

OTHER PUBLICATIONS

Demircan et al., Human Motion Reconstruction by Direct Control of Marker Trajectories, 2008, Advances in Robot Kinematics: Analysis and Design, pp. 263-272.*

(Continued)

*Primary Examiner* — Anh-Tuan V Nguyen
(74) *Attorney, Agent, or Firm* — Harness, Dickey & Pierce, PLC

(57) ABSTRACT

In a method for reconstructing a motion of an object from a sequence of motion pattern segments of a computer model of the object, a motion transition between an initial motion state and a final motion state of the object in a time interval of the motion is captured based on position data of the at least one sampling point which is received from the position (Continued)

marker. Further, at least one motion pattern segment corresponding to the motion transition is selected from a plurality of motion patterns of the computer model which are stored in a database such that the selected motion pattern segment leads with sufficient probability from the initial motion state to the final motion state for the time interval. Furthermore, an image of the motion of the object for the time interval is reconstructed using the initial motion state and the selected motion pattern segment.

15 Claims, 6 Drawing Sheets

(56) References Cited

U.S. PATENT DOCUMENTS

| | | | | |
|---|---|---|---|---|
| 8,055,073 | B1* | 11/2011 | Flagg | G06K 9/00744 382/173 |
| 8,712,146 | B2* | 4/2014 | Kim | G06T 13/40 345/419 |
| 2003/0193509 | A1* | 10/2003 | Brand | G06T 11/001 345/582 |
| 2005/0190979 | A1* | 9/2005 | Li | H04N 19/52 382/240 |
| 2005/0207617 | A1* | 9/2005 | Sarnoff | G01S 5/04 382/103 |
| 2006/0271520 | A1* | 11/2006 | Ragan | G06F 17/30663 |
| 2007/0253599 | A1* | 11/2007 | White | G01R 33/56509 382/107 |
| 2008/0018792 | A1* | 1/2008 | Bhat | G06T 13/40 348/578 |
| 2008/0036737 | A1* | 2/2008 | Hernandez-Rebollar | G06F 1/163 345/158 |
| 2009/0003513 | A1* | 1/2009 | Grass | A61B 6/032 378/8 |
| 2009/0115864 | A1* | 5/2009 | Ogawa | G06K 9/00248 348/222.1 |
| 2010/0002808 | A1* | 1/2010 | Pons | H04L 25/067 375/320 |
| 2010/0304931 | A1 | 12/2010 | Stumpf | |
| 2011/0043443 | A1* | 2/2011 | Kawano | A63F 13/10 345/156 |
| 2011/0044545 | A1* | 2/2011 | Jessen | G06K 9/6203 382/190 |
| 2012/0001828 | A1* | 1/2012 | Gallagher | G06Q 30/02 345/1.1 |
| 2012/0147014 | A1* | 6/2012 | Lee | G06K 9/00348 345/474 |
| 2013/0184861 | A1* | 7/2013 | Pratt | G05D 1/021 700/245 |
| 2013/0257877 | A1* | 10/2013 | Davis | G06T 13/80 345/473 |

OTHER PUBLICATIONS

Chan et al., A Virtual Reality Dance Training System Using Motion Capture Technology, Jun. 2011, IEEE Transactions on Learning Technologies, vol. 4, No. 2, pp. 187-195.*

Office Action dated Jun. 29, 2016 in Japanese Patent Application No. 2015-543387.

Nakamura, Yoshihiko and Takano, Wataru, "Realtime Unsupervised Selftuning Segmentation of Behavioral Motion Patterns Based on Probabilistic Correlation and Its Application to Automatic Acquisition of Proto-Symbols" Graduate School of Information Science and Technology, The University of Tokyo. vol. 27 No. 9, pp. 1046-1057. (2009).

Kilner J et al., "Summarised hierarchical Markov models for speed-invariant action matching", 2009 IEEE 12th International Conference on Computer Vision Workshops, ICCV Workshops, Institute of Electrical and Electronics Engineers, Sep. 2009, pp. 1065-1072.

Sehoon Ha et al., "Human motion reconstruction from force sensors", Computer Animation, ACM, Aug. 2011, pp. 129-137.

Gehrig D et al., "HMM-based human motion recognition with optical flow data", Humanoid Robots, 9th IEEE-RAS International Conference on, IEEE, Dec. 2009, pp. 425-430.

Bobick A F et al., "The Recognition of Human Movement Using Temporal Templates", Pattern Analysis and Machine Intelligence, IEEE Transactions on, IEEE Service Center, Mar. 2001, pp. 257-267.

Tran Thang Thanh et al., "Extraction of Discriminative Patterns from Skeleton Sequences for Human Action Recognition", Computing and Communication Technologies, Research, Innovation, and Vision for the Futute (RIVF), 2012 IEEE RIVF International Conference, Feb. 2012, pp. 1-6.

Qin Gu et al., "Compression of human motion capture data using motion pattern indexing", Computer Graphics Forum, Apr. 2008, pp. 1-12.

Huiyu Zhou et al., "Classification of Upper Limb Motion Trajectories Using Shape Features", IEEE Transactions on Systems, Man, and Cybernetics: Part C: Applications and Reviews, IEEE Service Center, Nov. 2012, pp. 970-982.

International Search Report PCT/ISA/210 for International Application No. PCT/EP2013/073558 Dated Mar. 21, 2014.

Written Opinion of the International Searching Authority PCT/ISA/237 for International Application No. PCT/EP2013/073558 dated Mar. 21, 2014.

Kulig D et al: "Incremental learning of human behaviors using hierarchical hidden Markov models," Intelligent Robots and Systems (IROS), 2010 IEEE/RSJ International Conference on, IEEE, Piscataway, NJ, USA, Oct. 18, 2010 (Oct. 18, 2010), Seiten 4649-4655, XP031920501, DOI: 1 0.11 09/1 ROS.2010.5650813; ISBN: 978-1-4244-6674-0.

Ott C et al: "Motion capture based human motion recognition and imitation by direct marker control," Humanoid Robots, 2008. Humanoids 2008. 8th IEEE-RAS; International Conference on, IEEE, Piscataway, NJ, USA, Dec. 1, 2008 (Dec. 1, 1998), Seiten 399-405, XP031825344, ISBN: 978-1-4244-2821-2.

Russian Office Action mailed on Sep. 28, 2016 for Russian Patent Application No. 2015118455/08(028619) and English translation thereof.

International Preliminary Report on Patentability dated Jun. 4, 2015.

Chinese Office Action issued May 18, 2017, in Chinese Application No. 201380070956.2, with English translation.

* cited by examiner

DEVICE, METHOD AND COMPUTER PROGRAM FOR RECONSTRUCTING A MOTION OF AN OBJECT

CROSS REFERENCE TO RELATED APPLICATIONS

This application is the National Phase under 35 U.S.C. §371 of PCT International Application No. PCT/EP2013/073558, which has an International filing date of Nov. 12, 2013, and which claims priority to German patent application number 10 2012 111 304.1 filed on Nov. 22, 2012, the entire contents of each of which are incorporated herein by reference.

BACKGROUND

Field

Embodiments of the present invention relate to devices, methods and computer programs for reconstructing a motion of an object by means of pre-constructed and/or pre-stored motion sequences of a computer model of the object.

Description of Conventional Art

In numerous applications, it seems desirable to be able to provide reliable motion reconstructions, such as for the situation and/or motion analysis in sports broadcasts. For example, in many sports, such as soccer, handball, American football, basketball, baseball, boxing—just to name a few— there is a need to analyze particular movement situations of athletes and/or a piece of play equipment (e.g. a ball) in real time or afterwards (post-production).

Currently, mainly optical, i.e., camera system-based, systems are used for this purpose by means of which motion situations of interest may be repeatedly reproduced and analyzed, for example by means of repetitions and slow motion settings. However, in practice, such systems regularly reach their limits so that it may repeatedly happen that even a slow motion does not allow for sufficient validity in terms of a doubtful game situation and/or a doubtful motion course. In some situation, a motion and/or a position of an object cannot be clearly recognized from a particular angle of view, such as an angle of a camera which has captured the game situation, as, e.g., a view of the decisive body parts and/or play equipment is blocked by other objects.

Particularly such incorrect decisions should be avoided which can dramatically affect the result of a sports event as sports events and their result in professional sports mostly entail a high financial and/or economic value. Prominent examples include penalty decisions, offside decisions or goal decisions in soccer. In other types of sport, there are decisions of a comparable level of importance which, based on optical systems, can often only be made in an insufficiently accurate way.

SUMMARY

In order to, if need be, be able to make game-deciding decisions in a more confident manner and/or to make more accurate and/or more subtle statements concerning motion courses, it is an object of the present invention to make available improved evaluation and/or analysis options for motion situations as compared to the prior art.

This object is achieved by devices, methods and computer programs with the features of the independent claims.

Further advantageous implementations and further developments are the subject of the dependent claims.

According to a fundamental idea, embodiments of the present invention use at least one database with pre-stored motion courses and/or motion pattern segments of a computer model which, in a computerized manner, are compared to subsequently captured real motion courses and/or motion pattern segments of a real object, such as a living being. If a motion pattern of the computer model of the object matching the real motion is found in the stored motion courses by means of a suitable algorithm, the real motion of the object may be reconstructed virtually based on the found motion pattern of the computer model. Using such a virtual motion reconstruction of a motion/movement actually performed by an object, such as a human or an animal, a kind of virtual reality can thus be created which offers significantly more flexible viewing and analysis options than are possible using conventional systems.

According to a first aspect of the present invention, a method for reconstructing a real motion of an object from a sequence of motion pattern segments of a computer model of the object is proposed. Here, each motion pattern segment corresponds to a different time interval and/or time period of the motion. Further, the object, e.g. a living being, particularly a human, comprises at least one sampling point coupled to and/or equipped with a sensor and/or position marker for a motion capture. According to embodiments, the method comprises the following acts:

a) capturing a real motion transition between an initial motion state and a final motion state of the object in a time interval of the real motion based on position data of the at least one sampling point which is received from the sensor/position marker;

b) selecting at least one motion pattern segment corresponding to the real motion transition from a plurality of motion patterns of the computer model stored in a database such that the selected motion pattern segment leads from the initial motion state to the final motion state for the time interval with sufficient (particularly highest) probability; and c) reconstructing a virtual image of the real motion of the object for the time interval by using the initial motion state and the selected motion pattern segment.

A sufficient probability shall hereinafter be understood to be a probability above a predefined probability threshold which may, if necessary, be adjusted to environmental or transmission conditions. In some embodiments, one or several potential motion pattern segments with different probabilities result when selecting the at least one motion pattern segment which corresponds to the real motion transition. Then, in some embodiments, that motion pattern segment may be selected from amongst these potential motion pattern segments which leads with the highest probability from the initial motion state to the final motion state for the time interval considered. For a finite number of possible motion states and motion transitions of the computer model, there will always be at least one motion pattern segment which, compared to others, leads with the highest probability from the initial motion state to the final motion state for the time interval considered.

According to some embodiments, the method may be an iterative, and preferably a computer-implemented, method which may be executed by means of an accordingly programmed hardware component, such as a processor or an integrated circuit, if a computer program realizing the method is executed and/or runs thereon. Thus, the above-listed method acts a) to c) may form a current iteration of an iterative method for reconstructing the motion. The initial motion state for the current iteration may hereby have been reconstructed and/or calculated in a previous iteration of the iterative method so that the reconstructed image of the motion may overall consist of a plurality of selected motion pattern segments corresponding to consecutive time intervals/iterations. When selecting, a captured and/or detected real motion transition of the object may be iteratively compared to the stored motion patterns of the computer model so that a hypothesis for a current motion state of the object is determined based on at least one past motion state of the object and a current transition probability which corresponds to a possible motion transition between at least two temporarily consecutive, discrete motion states of the object. Here, a current motion state and the at least one past motion state of the object may form a sequence of a Markov model, i.e., the different motion states and transitions may, according to some embodiments, be modeled using a discrete Markov chain. In such embodiments, by selecting the at least one motion pattern segment, the most probable sequence of motion states in a predefined Markov model and a captured (and possibly noisy) sequence of motion transitions may be determined in order to reconstruct the real motion of the object.

A hardware for executing the method which is programmed and set up accordingly may, according to another aspect of the present invention, be considered to be a device for reconstructing a real motion of an object from a sequence of motion pattern segments of a computer model of the object, wherein each motion pattern segment corresponds to a different time interval of the motion and wherein the object comprises at least one sampling point coupled to and/or provided with a sensor/position marker. Here, the device comprises a means for capturing and/or detecting a (real) motion transition between an initial motion state and a final motion state of the object in a time interval of the motion based on position data of the at least one sampling point received from the position marker. Furthermore, the device comprises a means for selecting at least one motion pattern segment corresponding to the motion transition from a plurality of motion patterns of the computer model stored in the database, wherein the selected motion pattern segment leads with sufficient probability from the initial motion state to the final motion state for the time interval. Furthermore, a means is provided for reconstructing an image of the motion of the object for the time interval using the initial motion state and the selected motion pattern segment. According to embodiments, the individual means may be understood to each be electronic circuit elements of the device.

The object whose motion is to be reconstructed may particularly be a multi-membered object in which individual members are separated and moveable to one another using jointed sections. Thus, for example, humans, animals, but also mechanical constructions may be subsumed under such an object. Sports equipment, such as balls or bats/clubs/rackets, are also conceivable. In order to be able to determine position data of individual object parts, sampling points at the object and/or at the individual object parts, e.g., joints and/or members, may each be provided with sensors. According to some embodiments, they may be radio-based sensors and/or position markers of a real-time locating system (RTLS=Real-Time Locating System) which can determine the geographical positions and/or coordinates (e.g. x, y and z coordinates) of the sensors and/or radio markers in real time. Thus, according to some embodiments, the means for capturing the real motion transition may be adjusted in order to capture the real motion and/or the real motion transition of the object in real time. Here, "real time" means a requirement that a result, e.g. provided or calculated coordinates, is definitely determined within a predefined time interval, i.e., is available prior to a particular time barrier. Hence, a real-time system should deliver a measurement or calculation result not only with the correct value, but also in due time, e.g., within a split second.

Thus, according to embodiments, a sensor and/or position marker may comprise an active radio transmitter which is attached at the object's sampling point to be localized and transmits radio signals for position determination to a radio receiver of the means for capturing the motion transition on a permanent or regular basis. The position marker may comprise any number of further sensors, such as acceleration, compass, orientation, gyroscopes, barometers, etc. For example, the receiver may capture the telemetry data such as for coordinates, speed data, acceleration data, etc. required for position calculation of a sensor on the basis of angle and run time measurements. In this connection, almost any radio frequency is basically possible, such as those of the ISM bands (ISM=Industrial, Scientific and Medical). According to one embodiment, a carrier frequency may be at, e.g., 2.4 GHz. A temporal distance between consecutive telemetry data samples may be adjusted to the speed and/or accuracy of the motion to be captured. For example, update rates of the telemetry data transmitted by radio of a few Hz to some kHz are conceivable.

One advantage of a radio-based locating system compared to optical systems is particularly that no optical shading of motion or game situations can occur. Position data determined and/or transmitted by radio allows a reconstruction of the object motion from any perspective, something that is not always possible for optical signals as described at the beginning. After a motion reconstruction, the reconstructed motion can be looked at virtually from any perspective.

Motion patterns and/or motion pattern segments of the computer model created in advance are in the database and/or an electronic memory and which correspond to possible real motions and/or motion sections of the object and are defined by continuous positions and/or coordinates of sampling points of the computer model. The sampling points of the computer model may basically correspond to those of the real object. Here, a motion pattern segment comprises at least one frame, but preferably a plurality of frames, of a motion of the computer model. The predefined motion patterns and/or motion pattern segments may be created in advance and/or initially, for example, by means of known motion capturing methods (Motion Capture), wherein, e.g., human motions/movements are transferred to a 3D model generated in the computer. The motion patterns stored in the database may thus be predefined three-dimensional motion patterns of a three-dimensional computer model which correspond to possible real motions of the object.

In particular, the recorded and/or modeled motions may be motions of particular interest afterwards in the motion reconstruction, such as particular punch combinations of a boxer or particular motion courses of a soccer player. In the initial motion pattern creation as part of a pre-production, sensors and/or markers may be attached to the same sampling points, such as to joints or particular body positions, as for the later movement reconstruction. For the initial motion pattern creation, non-radio based locating methods, such as optical methods, may also be used. In an optical tracking, cameras may be used which follow active (i.e., signal-emitting) or passive position markers on persons or items to be captured. With reference to the marker motions in the individual camera images (frames), the position of the markers may be calculated in 3D by means of triangulation. Furthermore, a markerless motion capture method is also possible using a pattern recognition in image processing. After a digitalization, the motion raw data captured in the pre-production may be imported into a 3D computer model and be further processed therein. Here, it may be transferred to a virtual skeleton (a kind of three-dimensional screen bean). This skeleton in turn may be linked to a wire mesh model which renders the recorded motions as a digital motion pattern and/or motion pattern segment. After an image synthesis and/or the rendering, it seems to the observer as if the virtual figure and/or the computer model executed the motions of the original persons or the original item.

A digital motion pattern and/or motion pattern segment pre-recorded in this way may then be stored in the database possibly normalized to a standard size. Here, a stored motion pattern segment may also belong to more than one motion sample. I.e., a digital motion pattern may consist of a plurality of digital motion pattern segments which correspond to different time intervals of the digital motion pattern, wherein, due to absolute and/or relative positions of the markers, certain temporal sequences of motion pattern segments are anatomically improbable or even impossible. Therefore, marker positions of temporally consecutive motion pattern segments should not fall below certain cross-correlation limits. Different complex digital motion patterns may in part comprise the same digital motion pattern segments which correspond to the same or very similar digital motion sections of the real motions corresponding to the different digital motion patterns.

According to some embodiments, the motion reconstruction may not only take place on the basis of the digital motion database but a physical model may also be taken into account for the object which prohibits and/or permits certain motions/movements. An advantage is here a physically correct modeling of the interpolation of the object motion between various motion patterns. Thus, for example, a transition from "running" to "jumping" can be "cross-faded" in a physically correct manner.

A real motion transition to be reconstructed between two motion states of the object may be captured and/or determined due to different discrete position data. The position data from the locating system in three-dimensional space constitutes here input data for the motion reconstruction. It originates from various positions at the object depending on where a transmitter (tag) was and/or is attached. In this context, a first discrete position data sample derived from the at least one position marker describes a first motion state (e.g. initial motion state) and a second subsequent position data sample describes a second motion state (e.g. final motion state) within a time interval between the two discrete position data samples. According to embodiments, the time interval may correspond to the duration of an individual image and/or frame of a pre-recorded motion pattern and/or motion pattern segment stored in the database, for example a period of $1/48$ to $1/12$ of a second, particularly $1/24$ or $1/25$ of a second. Thus, the captured motion transition corresponds to at least one trajectory of the at least one position marker located at the object in the time interval. In case of more complex objects, such as a human, it concerns a plurality of (radio-based) position markers in order to obtain a sufficient number of sampling points for the real motion to be captured. Thus, the captured motion transition corresponds to the initial and final positions of the sampling points in the time interval. Depending on object and motion, any initial and final positions of the sampling points (e.g. joints and skeleton sections) will anatomically not be possible, particularly in relation to previous time intervals.

If at least one real motion transition of the object to be reconstructed is captured and/or detected, using the same, at least one digital motion pattern segment corresponding to the real motion transition may be selected from the plurality of digital motion patterns of the computer model stored in the database. For example, this may be done by comparing the relative and absolute marker positions between captured real motion and stored digital motion pattern. In order to make this comparison as independent as possible from the object size, the captured position and/or motion data, and/or the digital motion models stored in the database may be normalized according to some embodiments. The normalization results here in a standard size of object. According to some embodiments, the digital motion patterns stored in the database can thus be normalized, wherein, to select the digital motion pattern segment, a scaling factor corresponding to an object size is applied to the position data received from the position markers at the object in order to obtain a normalized motion of the object.

According to embodiments, that digital motion pattern segment is selected which with a sufficient, preferably maximum, probability leads from the initial motion state to the final motion state for the time interval. According to some embodiments, the various possible motion states may here be modelled by means of a Markov model and/or a discrete Markov chain in order to indicate probabilities for the occurrence of any future events and/or motion states. A Markov chain has the characteristic that, by knowing a limited history, equally sound forecasts regarding the future development are possible as if the entire history of the process was known. In particular, the motion courses may also be modeled as a so-called Hidden Markov Model (HMM). An HMM is a stochastic model in which a system is modeled by a Markov chain with unobserved states. An HMM may be considered to be the simplest special case of a dynamic Bayesian network. The modeling as a Markov chain means that the system changes from one motion state into another one in a random way, wherein transition probabilities between motion states only depend on the current motion state in each case, but not on the previously adopted motion states. Furthermore, it is assumed that the transition probabilities are constant over time. However, in an HMM, these states themselves are not observed from the outside; they may be hidden. Instead, observable output symbols, so-called emissions, are associated with each of these internal states which occur with certain probabilities depending on the state. The object is mostly to arrive at probabilistic statements regarding the hidden states based on an observed sequence of emissions. Selecting one or several motion pattern segments which match one or several captured motion transitions may then, for example, be done by means of an algorithm of the dynamic programming, such as the forward, the backward or the Viterbi algorithm.

After one or several digital computer model motion pattern segments matching the captured real motion were selected in the above way, based thereon, the virtual image of the captured motion may be reconstructed and/or reproduced by means of the selected computer model motion pattern segments. According to various embodiments, the reconstruction may take place in real time and/or in a post-production process. The computer model motion pattern segments selected from the database, i.e., the computer model motion pattern segment frames, may be rendered on an electronic display means, such as a display. Ideally, the rendered motion of the computer model is similar to the real motion of the real object. In case of normalized, stored motion pattern segments, a scaling factor corresponding to a real object size may be applied to a selected motion pattern segment for reconstructing the image in order to reconstruct a denormalized motion course of the object with the at least one motion sampling point.

Thus, embodiments concern a concept which enables a motion reconstruction of moveable and multi-membered objects (e.g. humans, animals, mechanical constructs) and/ or object groups, for example, on the basis of radio-marker data. Here, an object group is several interacting objects, such as a player who dribbles with a ball, or a forklift and pallets. Radio markers and/or sensors can be attached at arbitrary sampling points of the object. An RTLS system of sufficiently accurate resolution may be provided which determines the position (e.g. in x, y and z coordinates) of the radio markers in real time. The radio marker positions may be given, e.g. by precise RTLS (Real Time Location Systems) data, in the form of x, y and z positions in space and/or acceleration data, etc. A virtual reconstruction of real objects can hereby be enabled with sufficient accuracy and update rate of the positions. The number of radio markers at the object can be varied upwards as required. The motion reconstruction may take place either in real time and/or in the post-production process.

Any number of digital motion samples may be in a digital motion database. Any, and any number of, digital motion sections may be stored for the object to be captured. For humans, they may encompass typical motions/movements, such as running, walking, jumping, etc. The stored motion sections may comprise a number of frames with the sampling points of the radio markers and the entire object.

Embodiments of the present invention allow an expedient and/or plausible motion reconstruction of the object even if the captured radio marker data is incomplete or noisy, and may, for example, be used for a virtual 3D motion reconstruction, for virtual reality applications, for augmented reality applications, for a training analysis, for a game analysis or for audiovisual media. A transfer of motion data to (mobile) terminal devices and a motion reconstruction on the terminal device are conceivable as well. Some embodiments also enable a reconstruction of motion data in real time using less hardware resources.

BRIEF DESCRIPTION OF THE DRAWINGS

Some embodiments of the present invention will be described in more detail in the following with reference to the accompanying drawing, in which.

DETAILED DESCRIPTION

In the following exemplary description of some embodiments of the present invention, like reference numbers refer to identical, similar or functionally identical elements and/or components.

Figure 1:
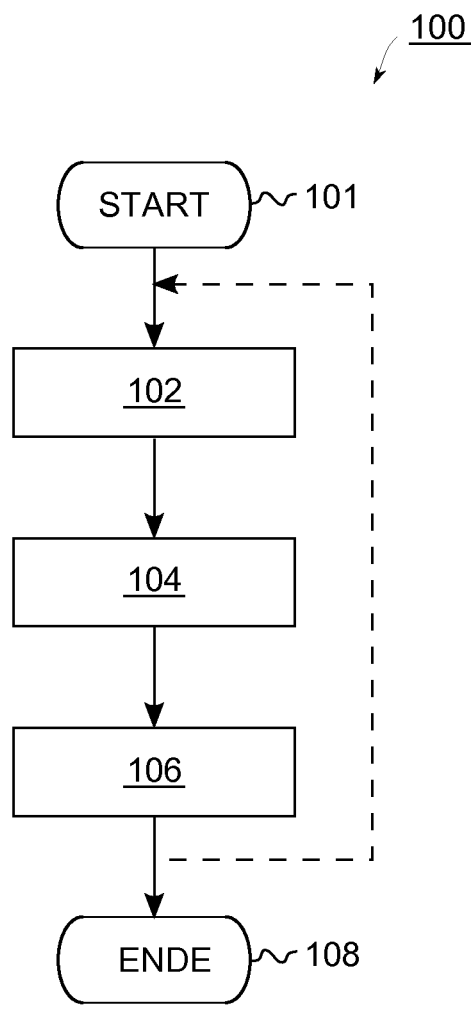
FIG. 1 illustrates a schematic flow chart of a method for reconstructing a motion of an object according to an embodiment.

In a schematic representation, FIG. 1 shows a flow chart of a method 100 for the virtual reconstruction of a real motion of an object, e.g. an athlete, from a sequence of digital motion pattern segments of a computer model of the object (e.g. of an athlete) created in advance according to an embodiment of the present invention.

In the motion reconstruction method 100, each motion pattern segment and/or each motion pattern section corresponds to a different time interval and/or section of a motion. The real object whose real motion is to be reconstructed has at least one motion sampling point provided with a position marker. According to some embodiments, the position markers may be radio-based position markers. The object may have one or several motion sampling points. The sampling points correspond to the attachment locations of the position markers.

Following an initial act 101, the motion reconstruction method 100 comprises an act 102 of capturing a (real) motion transition between an initial motion state and a final motion state of the object in a time interval of the real motion based on position data of the at least one motion sampling point received from the position marker. In case of radio-based position markers, the received position data may be more or less noisy. The method 100 further comprises an act of selecting 104 in which at least one digital motion pattern segment corresponding to the captured and/or detected real motion transition is selected from a plurality of digital motion patterns of the computer model stored in a database and/or a memory, such that the selected digital motion pattern segment with a sufficiently high probability leads from the initial motion state to the final motion state of the time interval. In another method act 106, a virtual image of the real motion of the object is reconstructed for the time interval using the initial motion state and the selected digital motion pattern segment.

According to some embodiments, the method acts 102 to 106 represent a current iteration and/or recursion of an iterative and/or recursive method for reconstructing the real motion of the object (e.g. athlete). This means that the initial motion state for a current iteration/recursion may have been reconstructed and/or estimated in a preceding iteration/ recursion of the iterative/recursive method so that the reconstructed, virtual image of the real motion may consist of a plurality of digital motion pattern segments which correspond to selected and consecutive time intervals or iterations/recursions. For a plurality of consecutive time intervals, this results in a reconstruction of the entire real motion of the object based on the motion pattern segments, respectively corresponding to the several time intervals. If a real motion course of interest was reconstructed by means of the method 100, the same may be terminated in a concluding act 108.

Figure 2:
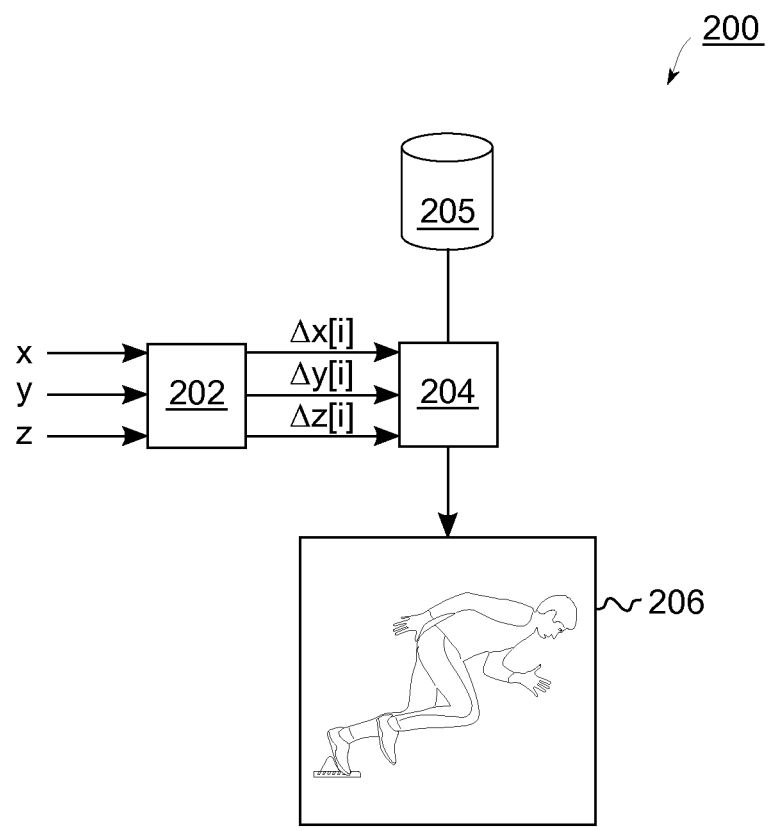
FIG. 2 illustrates a schematic block diagram of a device for reconstructing a motion of an object according to an embodiment.

The method 100 described with reference to FIG. 1 as an overview may be implemented by means of a device 200 for reconstructing a real motion of an object from a sequence of digital motion pattern segments of a computer model of the object which is now described in more detail in the following with reference to FIG. 2.

The device 200 which, for example, may be implemented as one or several processors comprises a motion capture means 202 which is configured to capture and/or detect a (real) motion transition ($\Delta x[i]$, $\Delta y[i]$, $\Delta z[i]$) between an initial motion state ($x[i-1]$, $y[i-1]$, $z[i-1]$) and a final motion state ($x[i]$, $y[i]$, $z[i]$) of the object in a time interval i of the (real) motion based on position data (e.g., x, y, and z coordinates) (and possibly noisy) of the at least one sampling point of the object received from the at least one position marker. In other words, the motion capture means 202 is used to execute the above described method act 102. The device 200 further comprises a selection means 204 coupled to the motion capture means 202 which is adjusted to select at least one digital motion pattern segment corresponding to the detected motion transition ($\Delta x[i]$, $\Delta y[i]$, $\Delta z[i]$) from a plurality of digital computer model motion patterns stored in a database 205, wherein the selected computer model motion pattern segment with a sufficiently high probability leads from the initial motion state ($x[i-1]$, $y[i-1]$, $z[i-1]$) to the final motion state ($x[i]$, $y[i]$, $z[i]$) of the currently considered time interval i. In other words, the selection means 204 is used to execute the method act 104 described above. Furthermore, as part of the device 200, a reconstruction means 206 coupled to the selection means 204 is provided which is configured to reconstruct an image of the motion of the object for the considered time interval i using the initial motion state ($x[i-1]$, $y[i-1]$, $z[i-1]$) and the selected digital motion pattern segment. In other words, the reconstruction means 206 is used to execute the method act 106 described above. Here, the image of the real motion may be reconstructed from one or a plurality of consecutive digital motion pattern segments from the database 205 and may be rendered, for example, via a suitable display device.

Figure 3:
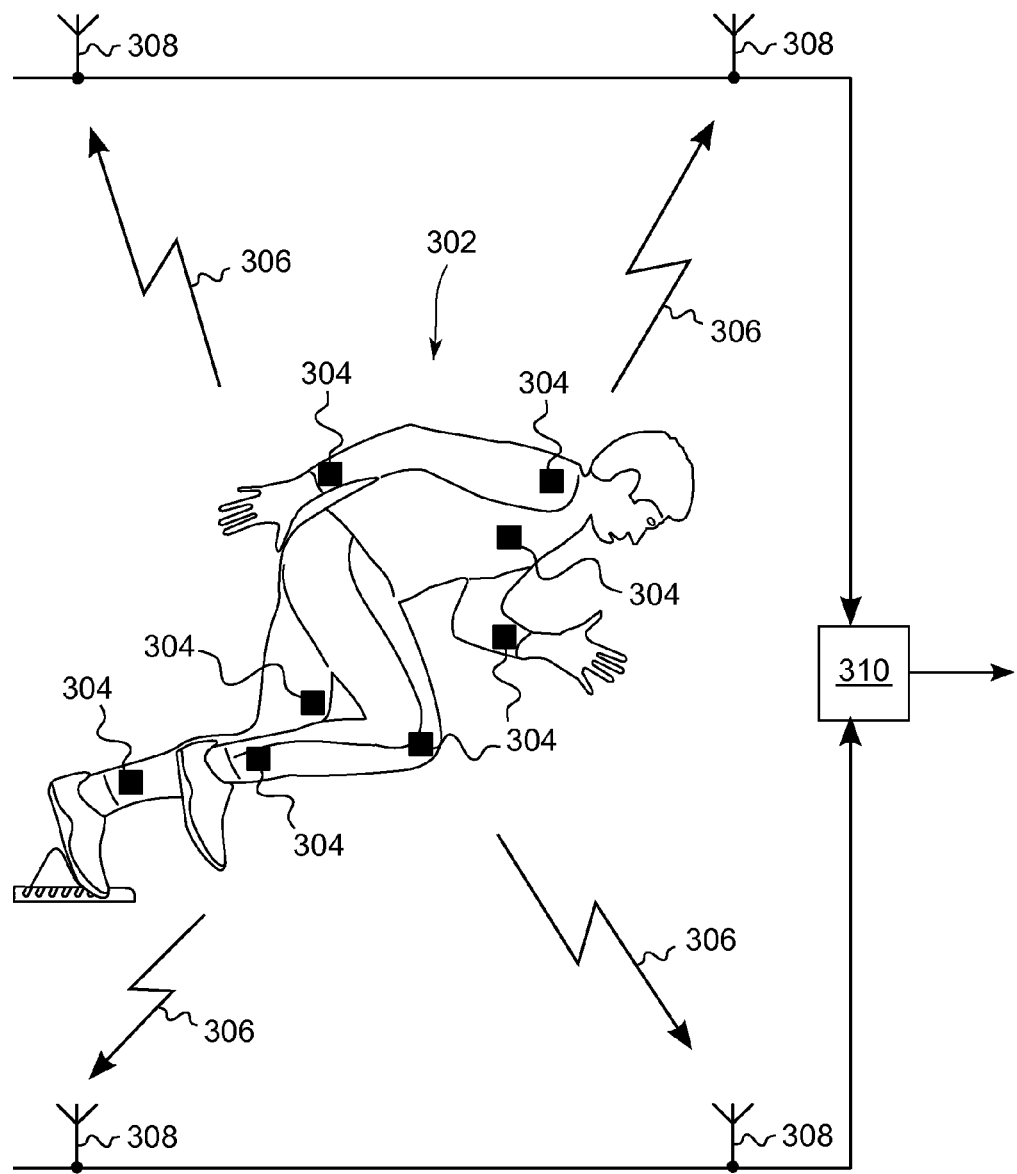
FIG. 3 illustrates a schematic representation for describing the capture of a real motion transition.

With reference to FIG. 3, it is now illustrated in which way capturing the real motion transition and/or the real motion can be executed by means of the position markers located on the object.

FIG. 3 shows an object 302 in the form of a schematized person. Position markers 304 are located at various motion sampling points of the object 302 which are used to determine the spatial positions of the different motion sampling points. According to one embodiment, the position markers 304 may particularly be radio-based position markers which send out locating radio signals 306 which can be received by at least one or also several receiving antennas 308. According to some embodiments, the locating signals 306 may here directly comprise geographical coordinates of the individual radio markers 304. In other embodiments, the individual geographical positions of the radio markers 304 may also be determined by means of other methods, such as triangulation by run time measurement or the like. The position data may here be determined in a frame-based manner, i.e. per frame (approx. 1/24 of a second) of the captured motion. For this purpose, for example, a receiver 310 may, based on angle and/or run time measurements, capture the telemetry data, such as x, y and z coordinates, speed data, acceleration data, etc. required to calculate the position of a radio marker 304 and make it available to the capture means 202 per frame. According to this, in embodiments, the at least one position marker 304 on the object 302 may be coupled to a radio transmitter which transmits signals 306, from which position data of the radio marker 304 may be derived, via a radio interface to the evaluation device 310 which in turn may be coupled to the reconstruction device 200 in order to execute the reconstruction method 100. In this context, the position markers 304 may form part of a real-time locating system so that the marker positions and/or the real motion of the object may be determined and reconstructed in real time.

Referring back to FIG. 2, previously created digital computer model motion patterns and/or their motion pattern segments, which may be represented by individual frames, may be stored in the electronic memory unit and/or database 205. A frame corresponds here to a previously created individual image (frame) of a computer model motion pattern. A computer model motion pattern which represents a pre-recorded motion course of interest virtually, is composed of no less than two frames according to some embodiments. According to this, a computer model motion pattern segment, which in turn may represent a subset of a computer model motion pattern, includes at least one frame. Consequently, a computer model motion pattern segment may well form part of two different overall motion courses and/or digital computer model motion patterns. This is due to the fact that more complex motions are mostly made up of several motion segments, wherein individual motion segments of different, complex motions may be equal to one another and/or be similar.

The computer model motion patterns stored in the database 205 which are composed of the computer model motion pattern segments and/or frames may be stored as normalized, digital motion patterns according to some embodiments. Thus, the objects and/or their computer models may be normalized, e.g., to a standard size in order to allow a better comparison with captured and/or detected real motions. The locations and/or positions at which position markers were carried when creating the computer model motion patterns are known and can basically correspond to those positions on the object on which the position markers for capturing the real motion to be reconstructed are subsequently carried. Thus, to select 104 a computer model motion pattern segment by the means 204, a scaling factor corresponding to an object size may be applied to the position data received from the position markers located on the object in order to obtain a normalized motion of the object and to be able to compare the same with the normalized motion patterns stored in the database 205. Thus, the motion patterns stored in the motion database 205 may already be normalized or be normalized in future. The radio marker and/or position data received in act 102 may also be normalized prior to the comparison and the selection 104. However, the scaling factor may here be memorized for the subsequent reconstruction 106. After a result has been established, the corresponding computer model motion pattern may be adapted to the real object via the scaling factor. Objects of different size may hereby be stored in a reasonable and space-saving manner.

The database 205 may contain typical motion patterns of persons/objects/object groups which may be identified and/or imaged by means of their motion sampling points. Artefact filters or the like are not required here as the motions queried from the database 205 preferably represent a homogenous form of motion/movement. Individual motion pattern segments and/or frames may be referred to as motion states and may be provided with imaginary edges and/or state transitions in the database 205. Individual, strongly resembling motion pattern segments and/or frames may possibly be summarized so that a digital frame and/or a digital motion pattern segment may simultaneously form part of two different motions and/or computer model motion patterns.

The selection means 204 which may also be referred to as a matching unit, may be set up in order to contain possible motion states and their probabilities to be in a particular motion and/or a frame. According to some embodiments of the present invention, the different motion states may be connected to one another as defined by a Markov chain. A current motion state and at least one past motion state of the object can thus form a sequence of a Markov model.

Figure 4A:
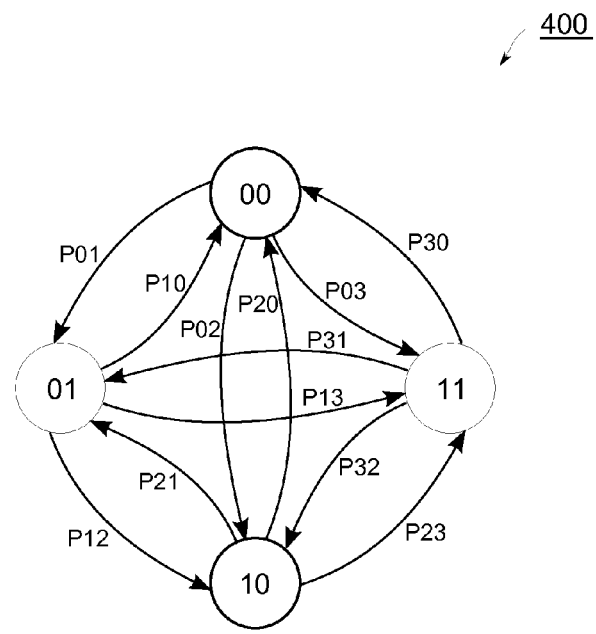
FIG. 4a illustrates an exemplary representation of a Markov chain for modeling motion states.

In this respect, FIG. 4a merely shows an example of a Markov chain 400 with four (motion) states "00", "01", "10", "11" and complete connections and/or edges between the states. Here, the edges describe state transitions, wherein a state transition is linked to a transition probability p. According to the Markov model of FIG. 4a illustrated as an example, a transition probability for a state transition from state "00" to state "01" is referred to as "$p_{01}$". Vice versa, "$p_{10}$" refers to a transition probability from state "01" to the state "00". The same applies to the further illustrated states. In the Markov chain 400 shown in FIG. 4a, a first state may change to any other second state, as clearly demonstrated by the illustrated state transitions (arrows). Of course, other Markov chains are also possible in which particular state transitions may be excluded. In particular, this will be the case in a Markov chain which describes possible real motion states and their transitions. As already discussed above, any subsequent states from an initial motion state are not possible due to anatomical and/or physical limits. It should therefore be noted that the simplified state model shown in FIG. 4a is provided for illustration purposes only and does not correspond to actual motion state models, particularly for complex motions. In practical implementations, a number of possible motion states may comprise a value of more than 1,000, more than 10,000, more than 100,000 and in some cases of application even more than 1 million.

Probabilities of presence of motion states at the discrete time instant i based on the state probabilities at the time instant i–1 and based on the current sensor measurement values can be iteratively calculated as, according to some embodiments, all possible motion states as defined by a Markov chain may be connected to one another. Thus, the method acts 102 to 106 described above may form a current iteration of an iterative method for reconstructing the real motion, wherein the initial motion state for the current iteration i was reconstructed and/or determined in a preceding iteration i–1 of the iterative method so that the reconstructed image of the motion is composed of a plurality of motion pattern segments corresponding to selected and consecutive time intervals or iterations. It may therefore be that a reconstructed complex motion is composed of two or more digital partial motion patterns stored in the database 205, e.g., due to overlapping frames and matching sensor measurement values. Therefore, there is no need to pre-record every complex and/or composed motion and store it in the database 205 as new composed motions may be generated from "sub-motions" and/or frame sequences.

Another factor is the number of transmitters and/or position markers available in the initial motion recording (pre-production) and the number of position markers in a motion scene currently to be reconstructed. Even though it may be an advantage if both a number and a position of the position markers are equal to one another in the initial motion recording and the scene currently to be reconstructed, this is not absolutely necessary. For example, it may be the case that, a sufficient number of transmitters and/or position markers can currently not be followed and/or tracked in parallel. According to some embodiments, it is therefore possible to only follow a permutation, i.e., a subset of the transmitters and their positions encompassed in the original and stored digital motion recordings. The probabilities which are determined in act 104 for the possible motion states may then take into account all possible permutations and can, as usual, preferably select the most probable distribution and motion state. Possibly, this may result in a distortion of the reconstruction result. "Distortion" here means that the reconstruction result is not accurate and/or does not correspond to the actual motion of the object. However, real distortions cannot be realized with the inventive concept as several edge motions/movements in the state graph do not allow impossible or unrealistic motions/movements. Therefore, only the next probable, digital frame sequence may each be represented so that a reconstructed motion image can never look like a "zombie" reconstruction.

Thus, the selection means and/or matching unit 204 may contain possible motion states (frames) together with their probabilities at each time instant i. These motion states may be connected by means of edges which in turn have probabilities (transition probabilities). These transition probabilities may be determined after recording the data (computer model motion samples) but prior to the motion reconstruction, for example, by determining transition frequencies or the like. Furthermore, continuous updating of the transition probabilities is possible due to actually determined and executed motion transitions. Several different resolutions can be created of a state graph (network), such as the Markov chain 400 by summarizing successive frames and/or motion states of a complete state graph (e.g. 100 motions/movements à 1,000 frames=approx. 100,000 motion states) with minor changes and/or deviations between the marker positions. The state space can hereby be reduced and thus also an effort to calculate the probabilities of presence (which is square to the number of motion states).

In order to calculate the motion state probabilities, one can initially begin with the smallest state model (i.e., few states) in order to relatively quickly obtain therein the most probable motion state. If there is still any computing time left, one can, for example, change into the next deeper state resolution (i.e., more states) and determine further motion state probabilities therein in order to obtain a higher level of detail for the motion reconstruction. According to some embodiments, a digital motion pattern segment may therefore be selected for a time interval i initially based on a subset of a set of possible motion states, wherein the subset is adjusted to be able to at least coarsely reconstruct the image of the motion, and wherein, after a coarse reconstruction, the image of the motion may be reconstructed more finely based on further states from the set outside the subset.

To select the digital motion pattern segment which best corresponds to the captured real motion transition in the time interval i, (hitherto) captured motion transitions may be iteratively compared to the digital motion patterns of the computer model stored in the database 205 such that a hypothesis for the current motion state of the object is determined based on at least one past motion state of the object and one current transition probability which corresponds to a possible motion transition between at least two temporarily consecutive, discrete motion states of the object. This is described in more detail in the following with reference to FIG. 4b.

Figure 4B:
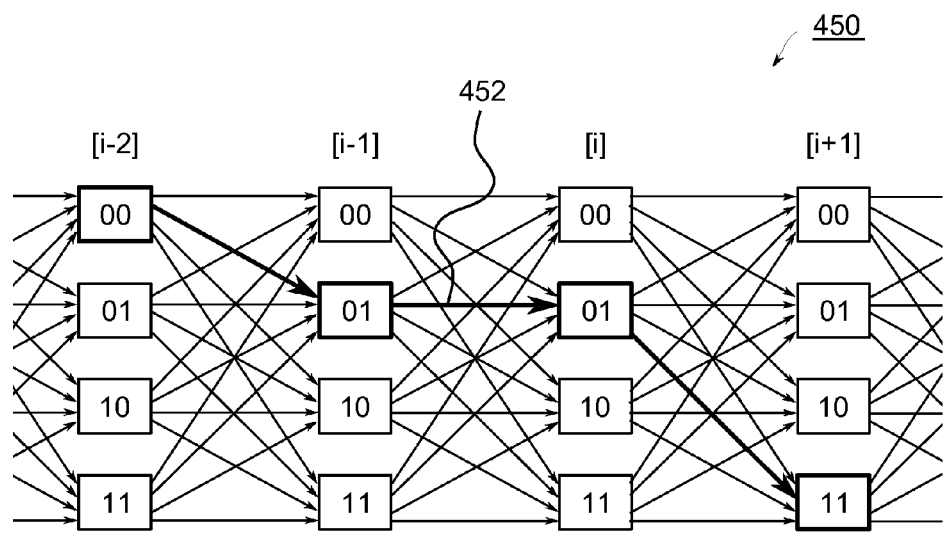
FIG. 4b illustrates a schematic representation for describing the selection of a digital motion pattern segment corresponding to the captured motion transition from a motion database by means of a trellis.

FIG. 4b shows a trellis diagram 450 which corresponds to the exemplary state model 400. Here, the trellis diagram 450 corresponds to the representation of the state transition diagram 400 which is plotted via the time axis. States "00", "01", "10", "11" and possible state transitions at the time instants i−2, i−1, i and i+1 are illustrated here as examples only. Different probability values (transition probabilities) p are associated with the transitions from one state to the next one, whereby, as a result of this, a single path 452, in most cases clearly, emerges in the trellis over several states which, based on the captured motion transition data, comprises the highest cumulative probability compared to all other paths. The motion transitions associated with this state path 452 are then considered by a motion decoder to be most probable motion transitions. That is, similar to the known Viterbi algorithm, one can successively run through various motion states in order to determine the currently most probable motion sequence. This may be referred to as "adaptive matching".

In some embodiments, when searching 104 for matching motion pattern segments and/or motion state transitions, only those computer model motion pattern segments may initially be taken into account which occur with the highest (transition) probabilities according to the Markov model, i.e., whose probabilities are, for example, above a predefined threshold value. For example, a matching computer model motion pattern segment may initially be looked for in the 100 most probable computer model motion pattern segments, then in the next probable 100 to 1,000 computer model motion pattern segments, etc. Such an embodiment may significantly accelerate locating a matching motion pattern segment.

According to some embodiments, transition probabilities found in the state transitions may be stored and used to improve the motion course reconstruction. This may also be done online and state transition probabilities may be adapted live. In other words, when selecting the motion pattern segments which correspond to the real motion transitions, a dynamic adjustment of the transition probabilities may take place during the run time using the actually found motion state transitions. This means that, for example, an initial, yet unsophisticated Markov model which describes possible motion states and transitions may continuously be adapted to actually observed motions/movements and may thus be improved. A low probability may adaptively be associated with less frequently occurring motion states and/or motion transitions of an object than with more frequently occurring motion states and/or motion transitions. Thus, a motion model (e.g. a Markov model) may continuously be adapted to a particular object during the run time. The system thus becomes quasi-capable of learning.

The selection means 204 and/or the matching unit may be considered to be a time-critical component. Reconstructing 106 the actual motion is feasible in constant time [O(I)], and therefore has very little adverse impact on the real-time capability of the method 100. In order to be able to meet so-called Worst Case Execution Times (WECT), the method 100 may return the hitherto best possible result at any conceivable time according to some embodiments. If additional time is still available for calculations, the result may be iteratively improved. When selecting 104 the digital motion pattern segment, a digital motion pattern segment may thus be selected after a predefined period of time following the capturing 102 of the real motion transition which, after this period of time, with the highest probability leads from the initial motion state to the final motion state for the time interval. For example, up to a first instant after receiving the position data, the digital motion pattern segment may be selected from a plurality of stored digital motion patterns which, at this first instant, corresponds with the highest probability to the captured real motion of the object, and wherein, after the first instant up to the second instant, the search for a better-matching motion pattern segment for the time interval is continued. Hence, time barriers can be met and the reconstructed image (e.g., with a delay of one frame) may be plotted. Such a method can be referred to as "progressive matching", wherein an image may be quickly displayed in "poor" quality and may bit by bit be drawn more finely. Here, poor quality means locating a non-100% matching frame and/or motion pattern segment of the computer model.

According to embodiments, various animations from the motion database 205 may be lined up her using recorded radio marker and/or position data of the sampling points. Here, the radio marker data is used as continuous and/or periodic input parameters and an alignment with the stored digital motion data takes place in order to select a matching computer model motion pattern with the lowest deviation within a predefined time span (e.g. ¹⁄₂₄ of a second). One option here is to store the computer model motion patterns in different quality grades and to then perform a progressive search, starting at the lowest quality. The advantage is a feedback within the predefined time span in order to be able to smoothly reconstruct the motion. Lower-quality computer model motion pattern samples may encompass less frames in order to restrict the data quantity to be searched. If there is still time within the predefined time span after selecting a motion pattern, a search in the next-higher quality grade may be carried out.

State transitions between the motion models may either be available a priori as further advantageous implementations or be created in real time during the reconstruction. This results in a dependency graph which illustrates the motion patterns as nodes and the transitions as edges with an edge weight (e.g., number of recognized transitions or probability of the transition). As a result of this, the most probable transitions may be searched first and later the more improbable transitions. Thus, a first solution may be found even in very limited periods of time which can then be refined if there is more time.

In some embodiments, additionally or alternatively, more fundamental motion information may be processed first, e.g. with regard to the temporal order of processing in a computing device. Motion resolutions with an increasing level of detail and a decreasing level of information content may, for example, be calculated at a later stage or optionally be omitted if there is no more computing time available. Another possible "sorting order" may be the size of the object on a screen. For small objects, there is no need to fully (100%) determine the correct motion state, it is sufficient for the motion to approximately match, as this is hardly perceived by the observer. Thus, when selecting a matching motion pattern segment, a higher priority may be assigned to a larger object than to a comparatively smaller object. Here, higher-priority objects may be reconstructed earlier in time than lower-priority objects. In addition or alternatively, different priorities may also be assigned to different sampling points of the real object. In this context, position data of higher-priority sampling points may be evaluated earlier in time than position data of lower-priority sampling points. Another option is a different temporal sampling rate of the stored motion patterns. Each motion pattern may be present in the database in different sampling rates (e.g., 1 Hz, 10 Hz, 20 Hz, . . . ). When searching for a motion pattern segment which corresponds to the real motion transition, the versions of the motion patterns with the lowest sampling rates are searched first through and then the ones with higher sample rates (e.g. with 1 Hz, then 10 Hz, etc.). Then, an alignment of interim steps (motion transitions) with a finer resolution, i.e., motion patterns with comparatively higher temporal sampling rates, may take place.

If the selection means 203 and/or the matching unit has identified a motion and/or a matching motion pattern segment and/or a matching frame from the database 205, the frame and/or the motion pattern segment may be taken from the database and be imaged to a display means. This is schematically illustrated in FIG. 5.

Figure 5:
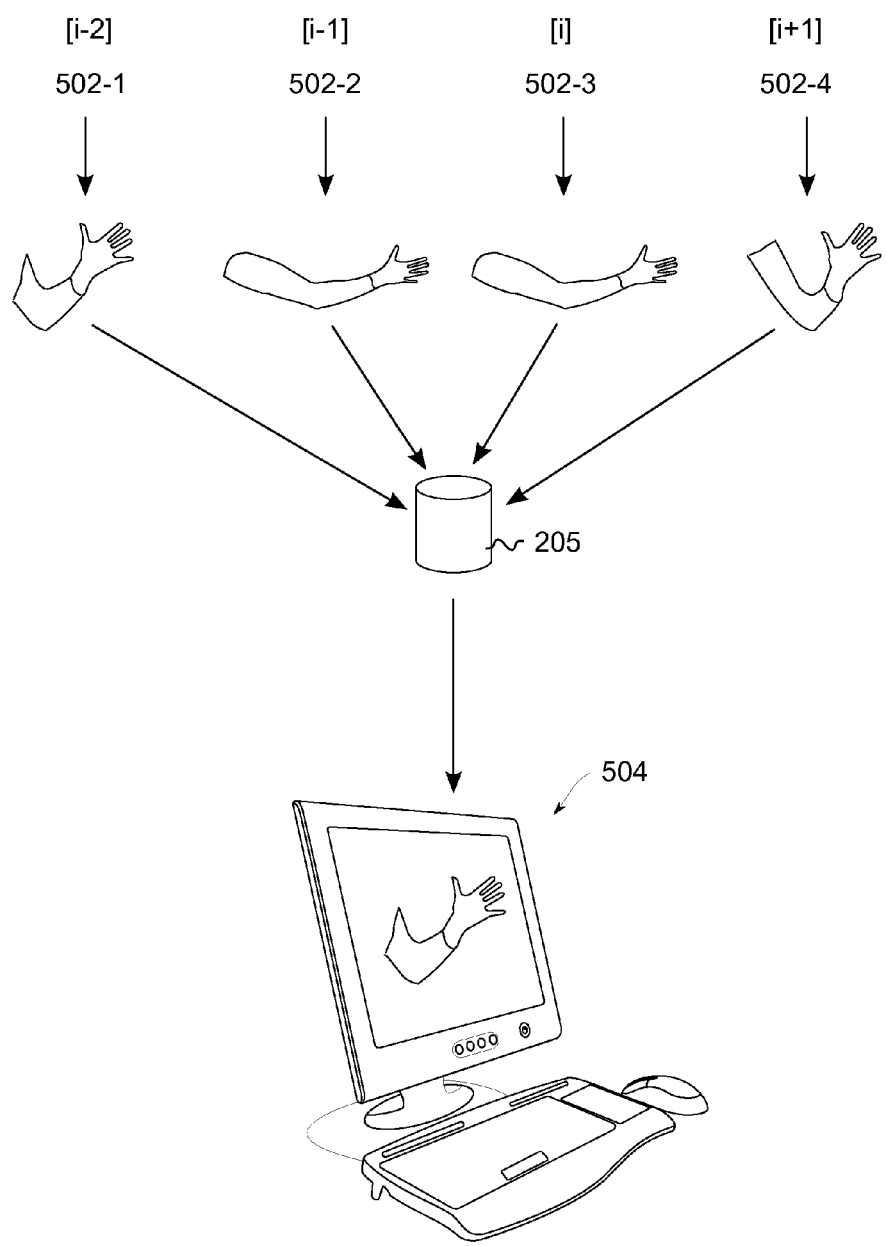
FIG. 5 illustrates a schematic representation for describing the reconstruction of a virtual image of the motion of the object using the selected digital motion pattern segment.

FIG. 5 only shows an example of four, temporally consecutive motion transitions 502-1, 502-2, 502-3 and 504-4 of an object (here: arm of a boxer) which correspond to consecutive time intervals [i−2], [i−1], [i] and [i+1]. Computer model motion pattern segments which match as closely as possible are selected from the database 205 for the illustrated motion transitions 502 using the method described herein in order to reconstruct and/or synthesize the overall motion of the object resulting from the detected motion transitions 502 by means of the computer model motion patterns stored in the database 205, and to then reproduce them on an output and/or display device 504.

In case of normalized motion transitions, particularly a matching normalized computer model motion pattern segment may be taken from the database 205 and be mapped to a target size and position with a previously extracted scaling factor and center of gravity. According to some embodiments, a motion pattern segment stored in the database 205 may thus be normalized (to a standard size) and a scaling factor corresponding to an object size may be applied to such segment to reconstruct the image in order to reconstruct an denormalized motion course of the object with the at least one sampling point. An orientation and/or viewing direction of the object may here be known from the motion pattern from which the frame and/or the motion pattern segment was taken.

In summary, embodiments relate to a concept comprising a method, a device and a computer program for reconstructing the motion (preferably in real time) of moveable and multi-membered objects (e.g. humans, animals, mechanical constructs) and/or object groups on the basis of position marker data.

Figure 6:
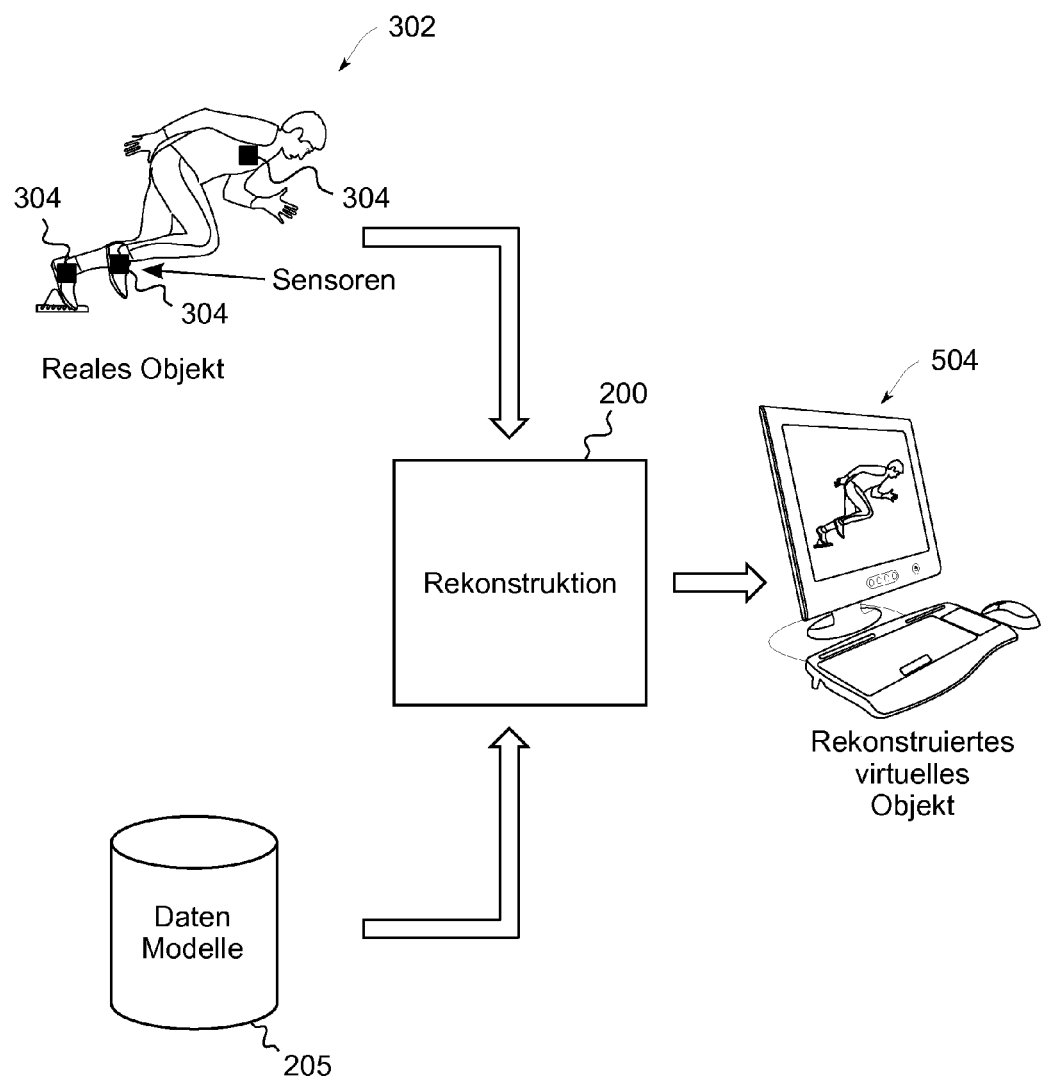
FIG. 6 illustrates a schematic block diagram of a system for reconstructing a motion of an object according to an embodiment.

As shown in FIG. 6, for this purpose, radio-based position markers 304 may be attached to any motion sampling points of an object 302. An RTLS system of sufficiently accurate resolution may be provided which, preferably in real time, determines the positions of the radio markers 304 in x, y and z. The radio markers 304 are given, e.g., by precise RTLS (Real Time Location Systems) data, in the form of x, y and z positions in space and/or acceleration data, etc. In a so-called motion database 205, there is any number of computer model motion samples. Any, and any number of, computer model motion sections, are stored for the object 302. For humans, this may encompass typical motions/movements, e.g. running, walking, jumping, etc. The computer model motion sections may encompass a number of frames with the sampling points of the radio markers and the entire object. Thus, a reasonable and/or plausible motion reconstruction of the object is possible using a device 200 for reconstructing the motion of the object 302 from a sequence of stored computer model motion samples of the object, even if the radio marker data is incomplete or noisy. The motion reconstructed in this way may be displayed via the output and/or display device 504. Thus, embodiments concern a concept which enables 504. Using embodiments, a reconstruction of real motions by means of virtual objects can be enabled with sufficient accuracy and update rate of the radio marker positions. The number of radio markers 304 may be varied upwards as required (at least one, ideally at the center of gravity). The reconstruction may take place either in real time and/or in the post-production process.

The features disclosed in the above description, the following claims and the drawings may both individually and in any combination be of importance for the realization of the invention in its different implementations.

Even though some aspects of the present invention were described in the context of a motion reconstruction device, it is understood that those aspects also represent a description of a corresponding motion reconstruction method so that a block or a member of a motion reconstruction device is also to be regarded as a corresponding method act or as a feature of a method act. In line with that, aspects described in the context of or as a method act also represent a description of a corresponding block or detail and/or feature of a corresponding device.

Depending on certain implementation requirements, embodiments of the invention may be implemented in hardware or in software. The implementation can be performed using a digital storage medium such as a floppy disk, a DVD, a Blu-ray disc, a CD, a ROM, a PROM, an EPROM, an EEPROM or a FLASH memory, a hard disk or another magnetic or optical memory on which electronically readable control signals are stored which are capable of interacting or do interact with a programmable hardware component such that the respective method is executed.

A programmable hardware component may be formed by a control device, a processor, a computer processor (CPU=Central Processing Unit), a computer, a computer system, an application-specific integrated circuit (ASIC), an integrated circuit (IC), a system on chip (SOC=System on Chip), a programmable logic element or a field programmable gate array (FPGA) with a microprocessor.

The digital storage medium may therefore be machine or computer-readable. Thus, some embodiments comprise a data carrier which comprises electronically readable control signals which are capable of interacting with a programmable computer system or a programmable hardware component in a way that one of the methods described herein is executed. Thus, an embodiment is a data carrier (or a digital storage medium or a computer-readable medium) on which the program for executing one of the methods described herein is recorded.

In general, embodiments of the present invention may be implemented as a program, firmware, a computer program or a computer program product with a program code or as data, wherein the program code or the data is effective to execute one of the methods if the program runs on a processor or a programmable hardware component. For example, the program or the data may also be stored on a machine readable carrier or data carrier. The program code or the data may be available as a source code, a machine code or a byte code amongst others, and as another intermediate code.

A program according to an embodiment may execute one of the methods during its execution, for example, by the same reading out memory locations or by writing a datum or several data into the memory locations, whereby switching operations or other operations are caused in transistor structures, in amplifier structures or in other electrical, optical, magnetic members, or members which operate according to another functional principle. Accordingly, data, values, sensor values or other information can be captured, determined or measured by a program, by reading out a memory location. Therefore, a program can capture, determine or measure sizes, values, measured quantities and other information by reading out one or several memory locations, and may cause, arrange for or execute an action by writing into one or several memory locations, as well as control other devices, machines and components.

The embodiments described above are purely illustrative of the principles of the present invention. It is understood that modifications and variations of the arrangements and details described herein are obvious to other persons skilled in the art. Therefore, it is intended that the invention be limited only by the scope of the following claims and not by the specific details presented with reference to the description and the explanation of the embodiments.

The invention claimed is:

1. A method for reconstructing a motion of an object from a sequence of motion pattern segments of a 3D computer model of the object, wherein each motion pattern segment corresponds to a different time interval of the motion and includes at least one frame, and wherein the object comprises at least one sampling point coupled to a position marker, the method comprising:
   a) capturing a sequence of motion transitions between an initial motion state and a final motion state of the object in a time interval of the motion based on position data of the at least one sampling point which is received from the position marker;
   b) selecting, based on possible motion states of a Markov model, at least one digital motion pattern segment corresponding to the sequence of motion transitions from a plurality of predefined digital motion patterns of the 3D computer model which are stored in a database and correspond to possible real motions of the object such that the at least one digital motion pattern segment leads with sufficient probability from the initial motion state to the final motion state for the time interval; and
   c) reconstructing an image of the motion of the object for the time interval by displaying the 3D computer model on a display using the initial motion state and the at least one digital motion pattern segment, wherein
      by selecting the at least one digital motion pattern segment, the most probable sequence of the possible motion states of the Markov model and the sequence of motion transitions is determined in order to reconstruct the motion of the object.

2. The method of claim 1, wherein acts a) to c) form a current iteration of an iterative method for reconstructing the motion, and wherein the initial motion state for the current iteration was reconstructed in a previous iteration of the iterative method so that the reconstructed image of the motion adds up from a plurality of digital motion pattern segments corresponding to selected and consecutive time intervals or iterations.

3. The method of claim 1, wherein, when selecting, captured motion transitions of the object are iteratively compared to the plurality of predefined digital motion patterns of the 3D computer model such that a hypothesis is determined for a current motion state of the object based on at least one past motion state of the object and a current transition probability which corresponds to a possible motion transition between at least two temporarily consecutive, discrete motion states of the object.

4. The method of claim 3, wherein the current motion state and the at least one past motion state of the object form a sequence of the Markov model.

5. The method of claim 1, wherein the at least one digital motion pattern segment is initially selected based on a subset of a set of possible motion states, wherein the subset is adjusted in order to be able to at least coarsely reconstruct the image of the motion, and wherein, following a coarse reconstruction, the image of the motion is finely reconstructed based on further states taken from the set of possible motion states outside the subset.

6. The method of claim 1, wherein, when selecting the at least one digital motion pattern segment, after a predefined period of time after capturing the sequence of motion transitions, a digital motion pattern segment is selected which, after this period of time, leads with the highest probability from the initial motion state to the final motion state for the time interval.

7. The method of claim 1, wherein the plurality of predefined digital motion patterns stored in the database are normalized, and wherein, to select the at least one digital motion pattern segment, a scaling factor corresponding to an object size is applied to the position data in order to obtain a normalized motion of the object.

8. The method of claim 1, wherein the at least one digital motion pattern segment is normalized and wherein a scaling factor corresponding to an object size is applied to the same for reconstructing the image in order to reconstruct a denormalized motion course of the object with the at least one sampling point.

9. The method of claim 1, wherein, up to a first instant after receiving the position data, the at least one digital motion pattern segment is selected from the plurality of predefined digital motion patterns which, at this first instant, corresponds with the highest probability to the motion of the object, and wherein, after the first instant up to a second instant, search for a better-matching digital motion pattern segment for the time interval is continued.

10. The method of claim 1, wherein different priorities are assigned to different sampling points of the object, and position data of higher-priority sampling points is evaluated earlier in time than position data of lower-priority sampling points.

11. The method of claim 1, wherein a higher priority is assigned to a larger object than to a comparatively smaller object, and wherein position data of higher-priority objects is evaluated earlier in time than position data of lower-priority objects.

12. The method of claim 1, further comprising:
   transmitting, by a radio transmitter coupled to the position marker, the position data to an evaluation device configured to perform the method for reconstructing the motion of the object.

13. The method of claim 1, wherein the position data is obtained from position markers of a real-time locating system and the method is performed under real-time conditions.

14. A computer program product comprising a non-transitory computer-readable medium having a computer readable program code embodied therein, the computer readable program code adapted to be executed to implement a method for reconstructing a motion of an object from a sequence of motion pattern segments of a 3D computer model of the object, wherein each motion pattern segment corresponds to a different time interval of the motion and includes at least one frame, and wherein the object comprises at least one sampling point coupled to a position marker, the method comprising:
   a) capturing a sequence of motion transitions between an initial motion state and a final motion state of the object in a time interval of the motion based on position data of the at least one sampling point which is received from the position marker;
   b) selecting, based on possible motion states of a Markov model, at least one digital motion pattern segment corresponding to the sequence of motion transitions from a plurality of predefined digital motion patterns of the 3D computer model which are stored in a database and correspond to possible real motions of the object such that the at least one digital motion pattern segment leads with sufficient probability from the initial motion state to the final motion state for the time interval; and c) reconstructing an image of the motion of the object for the time interval by displaying the 3D computer model on a display using the initial motion state and the at least one digital motion pattern segment, wherein by selecting the at least one digital motion pattern segment, the most probable sequence of the possible motion states of the Markov model and the sequence of motion transitions is determined in order to reconstruct the motion of the object.

15. A device for reconstructing a motion of an object from a sequence of motion pattern segments of a 3D computer model of the object, wherein each motion pattern segment corresponds to a different time interval of the motion and includes at least one frame, and wherein the object comprises at least one sampling point coupled to a position marker, the device comprising:

one or more processors configured to execute computer-readable instructions to capture a sequence of motion transitions between an initial motion state and a final motion state of the object in a time interval of the motion based on position data of the at least one sampling point which is received by the position marker;

select, based on possible motion states of a Markov model, at least one digital motion pattern segment corresponding to the sequence of motion transitions from a plurality of predefined digital motion patterns of the 3D computer model which are stored in a database and correspond to possible real motions of the object, wherein the at least one digital motion pattern segment leads with sufficient probability from the initial motion state to the final motion state for the time interval; and reconstruct an image of the motion of the object for the time interval by displaying the 3D computer model on a display using the initial motion state and the at least one digital motion pattern segment, wherein by selecting the at least one digital motion pattern segment, the most probable sequence of the possible motion states of the Markov model and the sequence of motion transitions is determined in order to reconstruct the motion of the object.

* * * * *